Figure 1:
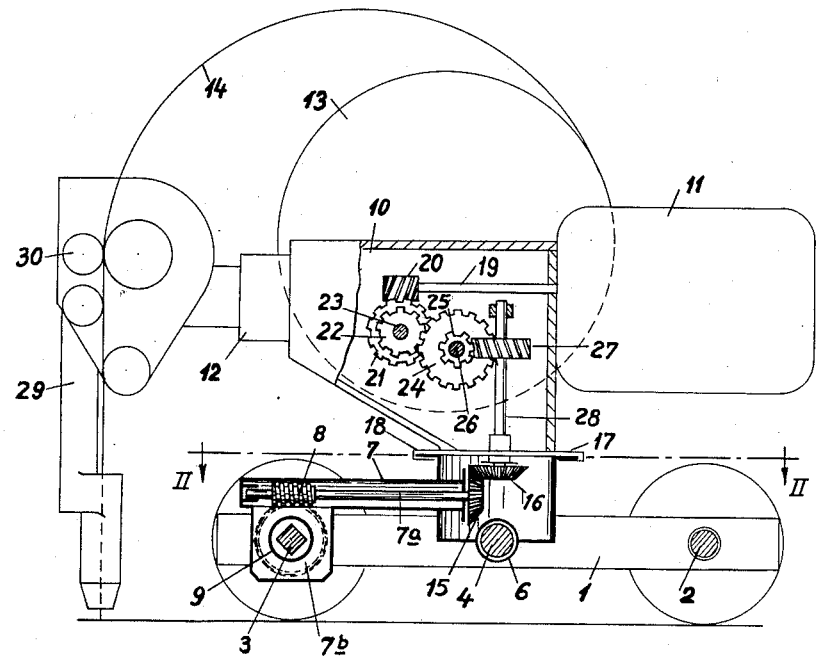

Aug. 12, 1958     A. CINK     2,846,898
CARRIAGE CONSTRUCTION FOR AUTOMATIC WELDING MACHINES
Filed Aug. 31, 1955

United States Patent Office 2,846,898
Patented Aug. 12, 1958

2,846,898

CARRIAGE CONSTRUCTION FOR AUTOMATIC WELDING MACHINES

Albin Cink, Bratislava, Czechoslovakia, assignor of one-half to CKD Ceska Lipa, narodni podnik, Ceska Lipa, Czechoslovakia Application August 31, 1955, Serial No. 531,791

Claims priority, application Czechoslovakia September 4, 1954

2 Claims. (Cl. 74—640)

This invention relates to improvements in automatic welding machines.

Automatic welding machines consist, in general, of two parts, namely, a carriage and a top portion or superstructure. The carriage carries the superstucture and the latter can rotate relative to the carriage about a vertical pivot which is capable of being shifted across the carriage, while the carriage can be advanced along the weld. The superstructure generally includes a gearbox, motor, welding head and a drum or reel carrying a roll of welding wire or electrode which can be unwound as required.

It is an object of the present invention to provide construction for an automatic welding machine of the type described above that permits movement of the welding elements along the weld, in a direction transverse relative to the direction of the weld and about a vertical pivoting axis.

In accordance with an aspect of the invention, the carriage of the automatic welding machine has two pairs of wheels mounted on parallel, spaced apart rotatable axles to support the carriage for movement along a weld. A rotatable screw is journalled in the carriage and extends parallel to the wheel carrying axles at a location between the latter, and a gear box is mounted on the screw and on one of the axles for movement therealong in a direction at right angles to the direction of movement of the carriage on the wheels. The gear box has a circular flange in a plane parallel to a plane containing both axles, and the superstructure is mounted movably on the circular flange to pivot relative to the gear box about an axis perpendicular to the plane containing the axles. The gear box includes means, for example, an internally threaded tubular member, threadably engaging the screw so that rotation of the latter causes movement of the gear box and superstructure relative to the carriage in the direction of the axles and screw. Further, in accordance with the invention, a transmission between drive means in the superstructure and the axle supporting the gear box includes a bevel gear in the gear box rotated from the drive means concentric with the pivoting axis of the superstructure and meshing with a bevel gear on one end of a drive shaft in the gear box extending at right angles to the axles, the other end of the drive shaft carrying a worm meshing with a worm gear that is slidable axially, and non-rotatable with respect to the axle on which the gear box is mounted. Preferably, the worm gear has an axially extended hub which forms a bearing for the gear box on the related axle.

Figure 2:
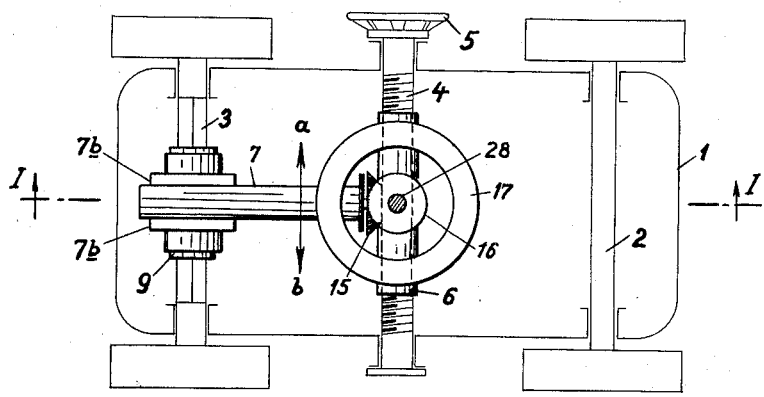

The above, and other objects, features and advantages of the invention, will be apparent in the following detailed description of an illustrative embodiment thereof which is to be read in connection with the accompanying drawing, wherein:

Fig. 1 is a vertical sectional view of an automatic welding machine embodying this invention, and taken along the line I—I of Fig. 2; and Fig. 2 is a horizontal sectional view taken along the line II—II of Fig. 1.

Referring to the drawing in detail, it will be seen that the automatic welding machine there illustrated includes a carriage having a frame 1 in which an axle 2 is supported to rotatably carry the rear wheels, while a driven axle 3 carrying the front wheels is also rotatably mounted in frame 1. A screw 4 is journalled in frame 1 and extends parallel to axles 2 and 3 at a location intermediate the latter. The screw 4 can be manually rotated by a handwheel 5 on one end thereof. A tubular internally threaded bearing 6 is connected to a gearbox 7 and threadably engages on the screw 4 so that, in response to turning of the screw, the gear box 7 is displaced relative to the frame 1 of the carriage in a direction parallel to the axes of axles 2 and 3. The gear box 7 has a drive shaft 7a rotatably mounted therein with its axis extending at right angles to the axis of the wheel carrying axles, and one end of shaft 7a extends adjacent axle 3 and carries a worm 8 in meshing engagement with a worm gear 9 mounted on axle 3. The worm gear 9 is slidable axially along axle 3 and is non-rotatably coupled to the latter, for example, by providing the axle 3 with a portion of non-circular cross-section received in a corresponding non-circular bore of the worm gear, as shown in Fig. 1, and the worm gear 9 is formed with an axially extended hub which forms a bearing on axle 3 for mounting portions 7b of the gear box 7. Thus, the gear box 7 is mounted on screw 4 by the tubular bearing 6 and on the axle 3 by the above described bearing of portions 7b on the hub of worm gear 9.

It will be apparent that rotation of drive shaft 7a is transmitted to axle 3 by way of worm 8 and worm gear 9. A bevel gear 15 is secured on the end of drive shaft 7a remote from worm 8 and meshes with a bevel gear 16 which is rotatable in gear box 7 about an axis that is perpendicular to the plane of axles 2 and 3. The gear box 7 is formed with a circular flange 17 that is concentric with the axis of bevel gear 16, and the superstructure 10 of the automatic welding machine has an annular rim 18 (Fig. 1), at its lower end, that movably embraces the flange 17 so that the superstructure 10 can pivot relative to the gear box about a vertical axis, that is, an axis which is perpendicular to the plane of axles 2 and 3 and coaxial with the bevel gear 16.

A drive motor is mounted within a casing 11 forming an extension of the superstructure, and the bevel gear 16 is connected to the shaft 19 of the drive motor by a suitable transmission which, as shown in Fig. 1, may include a worm 20 on shaft 19 meshing with a worm gear 21 which is rotatable with a spur gear 22 on a shaft 23, the spur gear 22 meshing with a spur gear 24 which is rotatable with a helical gear 25 on a shaft 26, and the gear 25 meshing with a helical gear 27 on a shaft 28 which is coaxial with the pivoting axis of the superstructure and has the bevel gear 16 secured to its lower end.

As in existing automatic welding machines, the superstructure 10 has a welding head 29 supported by an arm 12, and a reel or drum 13 is rotatably mounted on the superstructure to carry a roll of welding wire 14 which is fed between driven rolls 30 of the head 29.

The above described arrangement for the support of the superstructure of an automatic welding device on the carriage thereof greatly simplifies the manufacture of such automatic devices while increasing the precision of such manufacture, as this arrangement includes only a relatively small number of relatively shiftable parts and provides greater stiffness to the gear box to secure precise shifting movement of superstructure of the automatic welding machine transversely with regard to the carriage.

Although an illustrative embodiment of the invention has been described in detail herein with reference to the accompanying drawing, it is to be understood that the invention is not limited to that precise embodiment, and that various changes and modifications may be effected therein without departing from the scope or spirit of the invention, except as defined in the appended claims.

I claim:

1. In an automatic welding machine; the combination of a carriage having two pairs of wheels mounted on parallel, spaced apart rotatable axles to support the carriage for advancement along a weld, a rotatable screw journalled in said carriage and extending parallel to said axles at a location between the latter, a gear box mounted on said screw and on one of said axles for movement therealong in a direction at right angles to the direction of movement of said carriage on said wheels along a weld, said gear box having a circular flange in a plane parallel to a plane containing both of said parallel axles, a superstructure mounted movably on said flange to pivot relative to said gear box about an axis which is perpendicular to said plane containing the axles, means in said gear box threadably engaging said screw so that rotation of the latter causes movement of said gear box and said superstructure relative to said carriage in said direction at right angles to the direction of movement of the carriage, drive means in said superstructure, and transmission means between said drive means and said one axle including a first bevel gear in said gear box concentric with the pivoting axis of said superstructure and driven from said drive means in the latter, a drive shaft in said gear box extending at right angles to said axles and having a second bevel gear at one end meshing with said first bevel gear and a worm at the other end proximate to said one axle, and a worm gear slidable axially on said one axle and non-rotatable with respect to the latter, said worm gear meshing with said worm of the drive shaft.

2. In an automatic welding machine; the combination as in claim 1, wherein said means in the gear box threadably engaging said screw consists of an internally threaded tubular member integral with said gear box and through which said screw extends, and wherein said worm gear has an axially extended hub which forms a bearing for said gear box on said one axle.

No references cited.